US012781784B2

(12) United States Patent
Daly et al.

(10) Patent No.: US 12,781,784 B2
(45) Date of Patent: Nov. 3, 2026

(54) DRYWALL ANCHOR AND METHOD FOR INSTALLING A DRYWALL ANCHOR

(71) Applicant: fischerwerke Gmbh & Co. KG, Waldachtal (DE)

(72) Inventors: Aaron Daly, Pfalzgrafenweiler (DE); Christian Frey, Freudenstadt-Wittlensweiler (DE); David Lehmann, Alpirsbach (DE); Patrick Pfau, Alpirsbach (DE)

(73) Assignee: fischerwerke GmbH & Co. KG, Waldachtal (DE)

( * ) Notice: Subject to any disclaimer, the term of this patent is extended or adjusted under 35 U.S.C. 154(b) by 335 days.

(21) Appl. No.: 18/654,145

(22) Filed: May 3, 2024

(65) Prior Publication Data

US 2025/0075721 A1 Mar. 6, 2025

(30) Foreign Application Priority Data

Sep. 4, 2023 (DE) ..................... 10 2023 123 723.3
Jan. 31, 2024 (DE) ..................... 10 2024 102 664.2

(51) Int. Cl.
*F16B 13/00* (2006.01)

(52) U.S. Cl.
CPC .................................. *F16B 13/002* (2013.01)

(58) Field of Classification Search
CPC ..... F16B 13/002; F16B 25/0026; F16B 25/00
See application file for complete search history.

(56) References Cited

U.S. PATENT DOCUMENTS

| | | | | |
|---|---|---|---|---|
| 7,762,751 | B2 | 7/2010 | Panasik et al. | |
| 10,933,477 | B1 | 3/2021 | Patel | |
| 2006/0127199 | A1* | 6/2006 | Bappert | F16B 13/002 411/411 |
| 2006/0165506 | A1* | 7/2006 | Panasik | F16B 13/002 411/30 |
| 2008/0199275 | A1* | 8/2008 | Brown | F16B 13/0833 411/340 |
| 2010/0067975 | A1* | 3/2010 | Brown | F16B 13/002 403/22 |
| 2021/0003161 | A1* | 1/2021 | Adams | F16B 13/002 |
| 2021/0040971 | A1* | 2/2021 | Pirozzi | F16B 13/124 |

FOREIGN PATENT DOCUMENTS

| | | | |
|---|---|---|---|
| CN | 2474776 | Y | 1/2002 |
| DE | 27 37 857 | A1 | 3/1979 |
| DE | 10 2020 107 225 | A1 | 10/2021 |

(Continued)

OTHER PUBLICATIONS

International Search Report issued for related International Application No. PCT/EP2024/073626, mailed Nov. 13, 2024.

(Continued)

*Primary Examiner* — Eugene G Byrd
(74) *Attorney, Agent, or Firm* — Kathryn J. Imeli

(57) ABSTRACT

A drywall anchor and a method for installing the drywall anchor. The drywall anchor includes a drilling element at the front end of a base body for the introduction into a gypsum plaster board in a self-drilling manner and a non-circular region having a cross-section including at least three corners at the outer contour thereof. In particular, the non-circular region forms a prism.

19 Claims, 10 Drawing Sheets

(56) References Cited

FOREIGN PATENT DOCUMENTS

| | | | | |
|---|---|---|---|---|
| EP | 1026412 | A2 * | 8/2000 | ............ F16B 13/066 |
| EP | 3 577 350 | B1 | 7/2022 | |
| FR | 2653503 | B1 | 1/1992 | |
| JP | 6629080 | B2 | 1/2020 | |
| WO | 2007/083233 | A1 | 7/2007 | |

OTHER PUBLICATIONS

Search Report for related German Patent Application No. 10 2023 123 724.1, dated Apr. 11, 2024.

* cited by examiner

DRYWALL ANCHOR AND METHOD FOR INSTALLING A DRYWALL ANCHOR

This application claims priority under 35 USC § 119 to German Patent Application No. DE 10 2023 123 723.3, filed Sep. 4, 2023, and German Patent Application No. DE 10 2024 102 664.2, filed Jan. 31, 2024, the entire disclosures of which are incorporated herein by reference.

TECHNICAL FIELD OF THE INVENTION

The invention relates to a drywall anchor as well as to a method for installing a drywall anchor.

A drywall anchor of the type in question to be screwed into a gypsum plaster board in a self-drilling manner is known from the patent specification U.S. Pat. No. 7,762,751 B2. The drywall anchor includes a cylindrical base body including an external thread. A drilling element, by way of which a drill hole can be created in the gypsum plaster board, is disposed in one-piece at the front end of the base body. When the drywall anchor is screwed into the gypsum plaster board in a self-drilling manner, initially, a drill hole is drilled by way of the drilling element into the gypsum plaster board, into which the external thread is screwed without interrupting the screwing-in process, wherein the external thread cuts into the gypsum plaster board. The known drywall anchor is screwed into the drill hole until a flange, which is disposed so as to extend around the rear end of the base body, rests against an outer side of the gypsum plaster board. For fastening an attachment part, such as a hook, for example, to the gypsum plaster board, the attachment part is placed onto the flange, and a screw is screwed into a screw channel of the base body. The base body consequently spreads apart, breaking up at a predetermined breaking point in a front region of the base body, into two spreading bodies which latchingly engage a rear side of the gypsum plaster board so that the drywall anchor, and thus the hook, is securely and reliably fastened to the gypsum plaster board.

Another drywall anchor is known from the European patent EP 3 577 350 B1. This anchor includes a metal blade, serving as a drilling element, which is connected to the base body of this anchor in an axially fixed and non-rotatable manner by insert molding. At the front end of the cylindrical base body, additional anti-rotation ribs are disposed at the circumference thereof, which engage in the wall of the drill hole after the base body has been spread apart and prevent the drywall anchor from rotating along when a screw is screwed into a screw channel formed in the base body.

In addition, a drywall anchor is known from the unexamined patent application DE 10 2020 107 225 A1, in which, in contrast to the two drywall anchors described above, the drilling element is not permanently fixedly connected to the base body. In this drywall anchor, a reusable tool, which includes a cutting bit at the front end thereof, is pushed through the base body for installing the drywall anchor. For screwing in the drywall anchor in a self-drilling manner, the tool rests with a stop on a rear end of the base body. The tool is held non-rotatably in the base body by form fit. With the cutting bit, the tool protrudes over the front end of the base body and forms the drilling element of the drywall anchor when the anchor is screwed into a gypsum plaster board in a self-drilling manner. Furthermore, axially extending milling ribs are disposed on the lateral surface of the base body for widening the drill hole drilled by way of the drilling element and widen the drill hole to the diameter of the base body during the screwing-in process. Material that is removed from the gypsum plaster board is received in a slit splitting the base body at the front end in an axial plane, which weakens the base body and can cause the base body to become heavily deformed or fail when exposed to torsion.

SUMMARY OF THE INVENTION

It is the object of the invention to create a drywall anchor to be screwed in in a self-drilling manner, having improved installation.

The drywall anchor to be introduced into a gypsum plaster board in a self-drilling manner includes a base body and a drilling element. In particular, the drywall anchor additionally includes an external thread for cutting into the gypsum plaster board, which is provided at the base body so that the drywall anchor can be screwed into the gypsum plaster board in a self-drilling manner.

"Introduction in a self-drilling manner" shall be understood to mean that the drywall anchor according to the invention is suitable for creating a drill hole when being introduced into the gypsum plaster board, in which the drywall anchor is fastened, in particular by screwing in the external thread. The creation of the drill hole and the introduction of the drywall anchor into the drill hole are carried out in one installation step, which is to say without any planned interruption and without changing tools. For this purpose, the drywall anchor is placed with the drilling element at the front end onto a visible side of the gypsum plaster board. Then, the drywall anchor is turned, for example by way of a cordless screwdriver, about the longitudinal axis thereof and pushed against the gypsum plaster board. The drilling element cuts the drill hole into the board into which the drywall anchor is introduced, in particular, screwed. During screwing-in, the external thread cuts into the gypsum plaster board in the region of the drill hole wall. A two-stage setting process, which includes pre-drilling of the drill hole and subsequent introduction and necessitates two installation steps, using different tools, and thus requires more effort and time expenditure, is thus avoided.

The base body extends from a rear end to a front end, along a longitudinal axis of the drywall anchor, which is also the longitudinal axis of the base body. At the rear end which, in particular, is also the rear end of the drywall anchor, the base body includes a tool holder for a turning tool. The tool holder can, for example, be designed as a hexagonal socket or as a cross recess. A corresponding tool, for example a bit of a cordless screwdriver, can be inserted into the tool holder for turning the drywall anchor about the longitudinal axis thereof when screwed-in in a self-drilling manner. In particular, the drywall anchor, at the rear end thereof, additionally includes a flange which, in particular, is integrally connected to the base body and which, in particular, extends over the entire circumference of the base body. The flange serves to bear against a visible side of the gypsum plaster board and prevents the drywall anchor from being introduced too far into the gypsum plaster board. After installation as intended, the flange is flush with the visible side or rests thereon. In addition, the flange can transmit pressure forces to the gypsum plaster board, which are introduced from an attachment part that may rest on the flange into the drywall anchor. A screw channel is provided in the base body, which extends from the tool holder to the front end of the base body. The screw channel extends, in particular, axially and concentrically with respect to the longitudinal axis and can extend completely through the base body, up to the front end. The screw channel is used to receive a screw, by way of which an attachment part, for example a hook, can be fastened in the known manner to the drywall anchor, and thus to the gypsum plaster board. In addition, the screw channel, provided the screw channel is open at the front end, can receive a tool that forms the drilling element, as is previously known from the prior art described at the outset. In particular, in an embodiment not including a slit, the outer surface of the base body is completely closed, so that dust cannot enter the screw channel through the outer surface.

If the drywall anchor includes an external thread, the external thread is, in particular, connected in an axially fixed and non-rotatable manner to a circumferential surface of the base body, in particular integrally, and extends helically around the longitudinal axis of the drywall anchor. In particular, the base body, the external thread and, if present, the flange are produced in one piece from plastic material using an injection molding process. The external thread is, in particular, designed so as to cut independently into the gypsum plaster board when the drywall anchor is introduced into the drill hole. For this purpose, the external thread, in particular, has a maximum thread height, which corresponds to 0.15 times to 0.75 times, and preferably 0.2 times to 0.5 times, the outside diameter of the base body at the rear end of the external thread.

The drilling element is disposed at the front end of the base body, but is not a part of the base body. The drilling element forms the front end of the drywall anchor and the base body is arranged behind the cutting element. In particular, the drilling element is connected to the base body, in particular integrally. In particular, the drilling element is made of plastic material and injection-molded together and in one piece with the base body, which allows the drywall anchor according to the invention to be produced easily and cost-effectively. However, the drilling element can also be connected in an axially fixed and non-rotatable manner to the base body by insert molding, or can be placed as a separate tool through the base body, as is known from the prior art. In particular, the drilling element has a hollow, in particular crucible-shaped, core bit, which is open toward the front and in which material of a gypsum plaster board that was removed during installation of the drywall anchor in the gypsum plaster board can be received. This reduces or prevents removed material from egressing into the surrounding area when the drill hole is being created.

The drilling element preferably has a conical, truncated cone, or truncated pyramid-shaped design and is tapered to the front, toward a tip.

In particular, the core bit is designed to be hollow-cylindrical on the inside.

According to the invention, the base body includes a non-circular region, having a cross-section that includes at least three corners at the outer contour thereof. Each of the at least three corners is formed by corresponding adjacent surfaces of the base body. It is also possible for several non-circular regions to be present. In particular, exactly one non-circular region can be present. The cross-section of the base body is thus designed to be non-circular, having at least three corners, at least in a partial region, this being the non-circular region. "Region" shall be understood to mean a longer section extending in the direction of the longitudinal axis. The "region" can also extend over the entire length of the base body. The non-circular region, in particular, essentially extends over the entire length of the base body extending in the direction of the longitudinal axis and, provided a flange is disposed at the rear end of the base body, up to the rear flange. In particular, the non-circular region extends over at least 10 percent, in particular over at least 25 percent, and in particular over at least 50 percent of the length of the base body. In particular, the non-circular region is disposed in the front half of the base body or such that the non-circular region is at least partially located on the front half of the base body. In particular, the non-circular region extends from the front end of the base body toward the rear. The corners of the non-circular region form edges over the length of the non-circular region, which in particular extend parallel to the longitudinal axis. The corners or the edges do not have to be designed to be sharp-edged, but rather can have a slight chamfer or be slightly rounded, as is customary when injection molding plastic material.

In particular, in an embodiment not including a slit, the outer surface of the non-circular region, in particular the whole base body is uninterrupted and completely closed (i.e., is a continuous outer surface devoid of any open channels or gaps), so that removed material cannot enter the screw channel through the outer surface. The removed material will stay in the clearance and the outer surface prevents removed material from egressing out of the gypsum plaster board. In an embodiment that includes a slit, the outer surface is otherwise uninterrupted and completely closed. In one embodiment, the slit can initially be closed, for example by a thin molded plastic web, so that removed material cannot enter the screw channel during installation but allows the slit to widen for spreading when a screw is inserted in the screw channel. While spreading, the web can stretch and tear, but the screw will prevent removed material from egressing out of the gypsum plaster board.

The cross-section form of the non-circular region, including the at least three corners at the outer contour thereof, makes it possible for material removed from the gypsum plaster board, which arose when the drywall anchor according to the invention was screwed into the gypsum plaster board in a self-drilling manner, for example drill dust, to be received in a clearance between the base body and the drill hole wall, which improves a seating of the drywall anchor in the gypsum plaster board, and prevents removed material from egressing out of the gypsum plaster board. A cross-section having exactly six corners has proven to be particularly advantageous, since there is a balanced ratio of clearance, contact with the drill hole wall, and feasible material thickness, of the base body, which, when having six corners, can also be designed to be sufficiently stable in the region of the screw channel and the tool holder to reliably absorb torsional forces.

In particular, in an embodiment not including a slit or slits closed by a web, the outer surface of the non-circular region, in particular the whole base body is uninterrupted and/or completely closed (i.e., is a continuous outer surface devoid of any open channels or gaps), so that removed material cannot enter the screw channel through the outer surface. The removed material will stay in the clearance and the outer surface prevents removed material from egressing out of the gypsum plaster board. In an embodiment that includes a slit, the outer surface is otherwise uninterrupted and completely closed.

The drilling element preferably has an outside diameter that is smaller than the outside diameter of the non-circular region of the base body. When the outside diameter of the non-circular region of the base body is larger than the drilling element, the base body may more effectively widen the drill hole. In particular, the outside diameter of the non-circular region is the maximum outside diameter of the base body, wherein the outside diameter of a possibly present flange is not being considered, since the flange is not part of the base body, but disposed thereon. "Outside diameter" shall be understood to mean the diameter of an imaginary circumcircle around the drilling element, around the non-circular region or around the base body, the center of which is located on the longitudinal axis of the drywall anchor, with the circumcircle itself being located in a radial plane with respect to the longitudinal axis.

The corners, or the edges extending over the round cross-section, preferably form milling elements for widening the drill hole. In particular, when the drilling element has a smaller outside diameter than the non-circular region of the base body, the corners or the edges increase the diameter of the drill hole by milling, following on the drilling element, and thus widening the drill hole so that the diameter of the drill hole corresponds to the outside diameter of the base body. Material removed during widening can be received in the clearances present between the drill hole wall and the non-circular region, so that the removed material does not egress to the outside, out of the drill hole, or impair the drywall anchor being screwed into the gypsum plaster board.

It is furthermore preferred that at least one additional milling body is disposed at least at one of the corners or between at least two neighboring corners of the non-circular region, so as to widen the drill hole during the screwing-in process, in particular a milling rib. The milling body or the milling rib, in particular, projects radially from the base body and to the outside beyond the corner at which the body or rib is disposed. The milling body or the milling rib is, in particular, also made of plastic material and is, in particular integrally, connected to the base body, in particular during production by injection molding. The milling body or the milling rib can include one or more openings, in particular one or more notches, over the axial length, which allow removed material to pass through into the clearances between the base body and the drill hole wall.

In particular the corners and/or the milling bodies extend parallel to the each other and/or to the longitudinal axis of the base body to get a symmetrical geometry, which ensures a good setting behavior.

At least two neighboring corners of the non-circular region are preferably connected by a curve, which is not just imaginary, but forms the outer contour of the cross-section in the non-circular region. “Curve” here, generally speaking in the mathematical sense, denotes a one-dimensional object, which may be curved, but may also not have a curvature or have the curvature of “zero.” The curve is located within an imaginary circumcircle which circumscribes the base body in the non-circular region. This circumcircle then corresponds to the circumcircle which determines the outside diameter of the non-circular region. The curve is thus located within the outside diameter of the non-circular region. The curve is preferably a stretch between the two neighboring corners, wherein “stretch” refers to the shortest connection between the two corners, which is to say is a straight line.

In a preferred embodiment of the drywall anchor according to the invention, the cross-section of the non-circular region including the at least three corners at the outer contour thereof is a polygonal area, which is to say an area enclosed by a polygon. Each of the at least three corners is formed by corresponding adjacent surfaces of the base body. The polygon forms the outer contour of the non-circular region of the base body including the at least three corners. The polygon is, in particular, a hexagon. Depending on the extension of the cross-section having the polygonal area in the longitudinal direction, the screw channel and/or the tool holder can be located in the cross-section having the polygonal area. The outer contour of the cross-section is preferably a regular polygon, and in particular a regular hexagon. The polygonal cross-section, in particular the cross-section designed as a hexagon, in particular the cross-section designed as a regular hexagon, has proven to be particularly advantageous since a sufficiently large clearance arises between the polygon and the drill hole wall for receiving material removed when the drywall anchor is screwed into the gypsum plaster board. This applies, in particular, when the polygonal cross-section extends over a majority of the length of the base body.

In the case of a polygonal cross-section, the corners of the cross-section provide an optimal milling and widening function which operates more efficiently in comparison to a standard cylindrical cross-section. More specifically, the corners of the outer contour of the non-circular region of the base body form milling elements that expand the drill hole while maintaining the integrity of the gypsum plaster board. In the case of a polygonal cross-section, the corners of the cross-section rest against the drill hole wall, while the straight stretches connecting the corners are spaced apart from the drill hole wall and expose the clearance or the clearances. A hexagonal cross-section has proven to be well-suited for this purpose, since the ratio of the clearances between the drill hole wall and the base body, and the contact of the corners of the base body with the drill hole wall, provides a very balanced design with respect to the screw-in behavior of the drywall anchor into the gypsum plaster board and the seating of the screwed-in drywall anchor in the gypsum plaster board. Moreover, the wall of the drywall anchor can be designed to be torsionally rigid so that the drywall anchor does not fail when screwed in.

Preferably, the non-circular region is a prism, or includes a prism, in particular a prism having lateral surfaces that extend parallel to the longitudinal axis, in particular including six lateral surfaces that are parallel to the longitudinal axis and that, in particular, have identical surfaces.

As an alternative, the non-circular region is a frustum of a pyramid or includes a frustum of a pyramid. This means that the cross-section of the non-circular section changes over the length, and in particular tapers to the front, toward a tip of the drilling element. In another preferred embodiment, the non-circular base body may also incorporate a conical outer surface proximal to the peripheral flange. The tapered or frustoconical shape of the non-circular region of the base body serves to widen the drill hole as it is drilled into the gypsum plaster board by the drilling element. In addition, the tapered or frustoconical shape structure provides improved holding function which operates differently than a standard and generally cylindrical shaft. In particular, the frustum of a pyramid includes six lateral surfaces.

The non-circular region can also include a combination of at least one prismatic section and at least one truncated pyramid-shaped section.

The non-circular region can also change in the cross-section thereof along the longitudinal axis, wherein the number of the corners, in particular, remains constant over the length of the non-circular region. In particular, two cross-sections that are spaced apart from one another are geometrically similar.

In particular, the diameter of the drywall anchor increases along the longitudinal axis thereof from the front to the rear over the entire length thereof so as to have the smallest diameter at the front end, and the largest diameter at the rear end.

It is possible for the corners of the cross-section along the longitudinal axis to turn about this axis, which is to say, form a helix. If this helix has a direction of rotation opposite the external thread, this can cause removed material to be displaced forwardly.

Instead of being straight over the entire length, the curve, which connects the at least two neighboring corners in the non-circular region, can be curved at least in sections, in particular concavely, to the inside toward the longitudinal axis, whereby the existing clearance between the base body and the drill hole wall is increased.

The base body is preferably slotted, which is to say, has at least one slit that completely extends radially through the base body. In particular, the slit extends transversely to the longitudinal axis in a front section. In particular, the slit extends in a straight manner in a rear region of the slit, in particular parallel to the longitudinal axis, and transversely to the longitudinal axis in a front region, which allows favorable spreading behavior when a screw is being screwed into the screw channel. The slit forms two spreading bodies at the base body, which are, in particular, connected to one another by a predetermined breaking point, in particular at the front end of the slit. If an external thread is present, the external thread, in particular, is interrupted in the region of the slit so that the external thread does not impair spreading. The slit does not extend over the entire length of the base body and, in particular, not to the front end thereof.

In a front section, the base body preferably has a pyramid-shaped or truncated cone-shaped design, which is to say the outside diameter changes in this section. In particular, the cross-section thereof decreases from the rear to the front, which is to say the base body thus has a smaller outside diameter at the front end of the front section than in a rear section which adjoins the front section. The front section can be the non-circular section or form a part of the non-circular section. The cross-section of the front section is, in particular, geometrically similar to the rear section, which is to say when the rear section of the base body is designed as a cylinder having a hexagonal cross-section, the front section likewise has hexagonal cross-sections. In particular, the front section is a frustum of a pyramid having a hexagonal base surface, and the adjoining rear section is designed as a hexagonal prism, which adjoins the rear end of the frustum of a pyramid with the same cross-sectional surface.

In the method according to the invention for installing the drywall anchor according to the invention, a fastening system is created which includes the drywall anchor and a gypsum plaster board. When the drywall anchor according to the invention is screwed into the gypsum plaster board by way of the drilling element, a drill hole is drilled into the gypsum plaster board. According to the invention, material removed from the gypsum plaster board in the region of the drill hole is received in a clearance between the drill hole wall and the circumferential wall of the base body between two neighboring corners of the non-circular region of the base body. It is particularly advantageous when the cross-section of the non-circular region is a polygonal area, and in particular when the non-circular region of the base body or the entire base body is designed as a prism or as a frustum of a pyramid. A hexagonal cross-section has proven to be particularly advantageous.

For the method according to the invention, it is preferred that the drilling element has an outside diameter that is smaller than the outside diameter of the non-circular region of the base body, so that the non-circular region of the base body widens the drill hole during screwing-in, by way of the corners serving as milling elements and/or at least one milling body. The drill hole is widened to the outside diameter of the non-circular region so that the drywall anchor according to the invention is seated firmly in the drill hole. In particular, the diameter of the drilling element additionally increases over the length thereof toward the base body, so that the more the drilling element penetrates into the gypsum plaster board, the more the drill hole is widened by way of the drilling element.

The features and feature combinations, designs, and embodiments of the invention mentioned above in the description, and the features and feature combinations mentioned hereafter in the description of the figures and/or shown in a figure, can be used not only in the respective indicated or illustrated combination, but also in other essentially arbitrary combinations, or alone.

Embodiments of the invention that do not include all the features of a dependent claim are possible. It is also possible to replace individual features of a claim with other disclosed features or feature combinations. Embodiments of the invention that do not include all the features of the exemplary embodiment or exemplary embodiments, but an essentially arbitrary portion of the characterizing features of one exemplary embodiment, optionally in combination with one or more of, or all of, the features of one or more further exemplary embodiments are possible.

BRIEF DESCRIPTION OF THE DRAWINGS

The invention will be described hereafter in greater detail based on five exemplary embodiments shown in the drawings.

In the drawings.

DETAILED DESCRIPTION OF THE INVENTION

Figure 1:
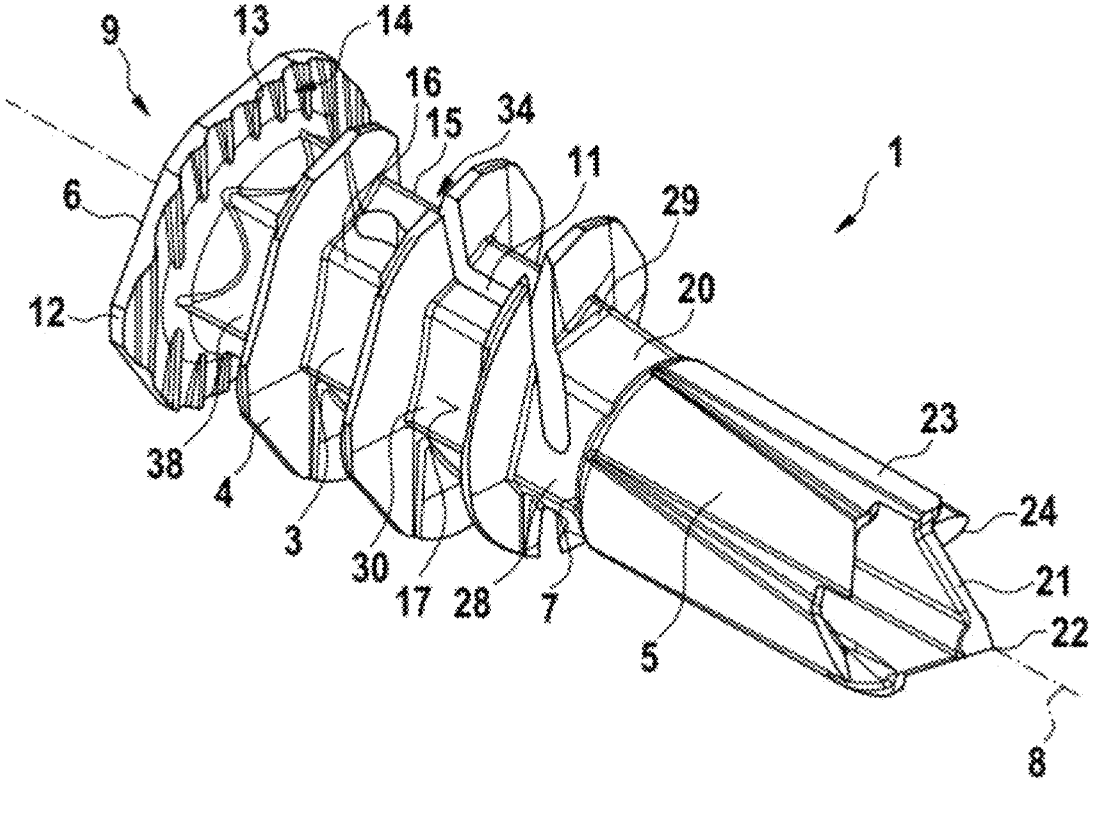
FIG. 1 shows a first drywall anchor according to the invention in a perspective view.
Figure 2:
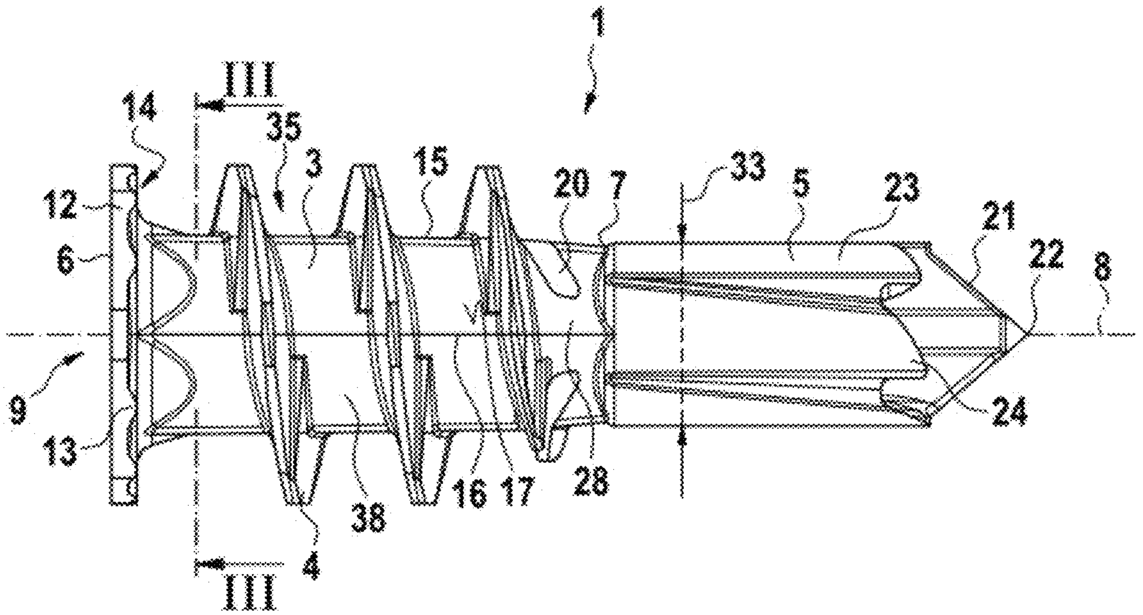
FIG. 2 shows a side view of the first drywall anchor according to the invention from FIG. 1.

In general, identical parts are denoted by the same reference numerals in the figures.

FIGS. 1 to 4 show a first drywall anchor 1 according to the invention to be screwed into a gypsum plaster board 2 in a self-drilling manner. The drywall anchor 1 according to the invention includes a base body 3, an external thread 4, and a drilling element 5.

Figure 3:
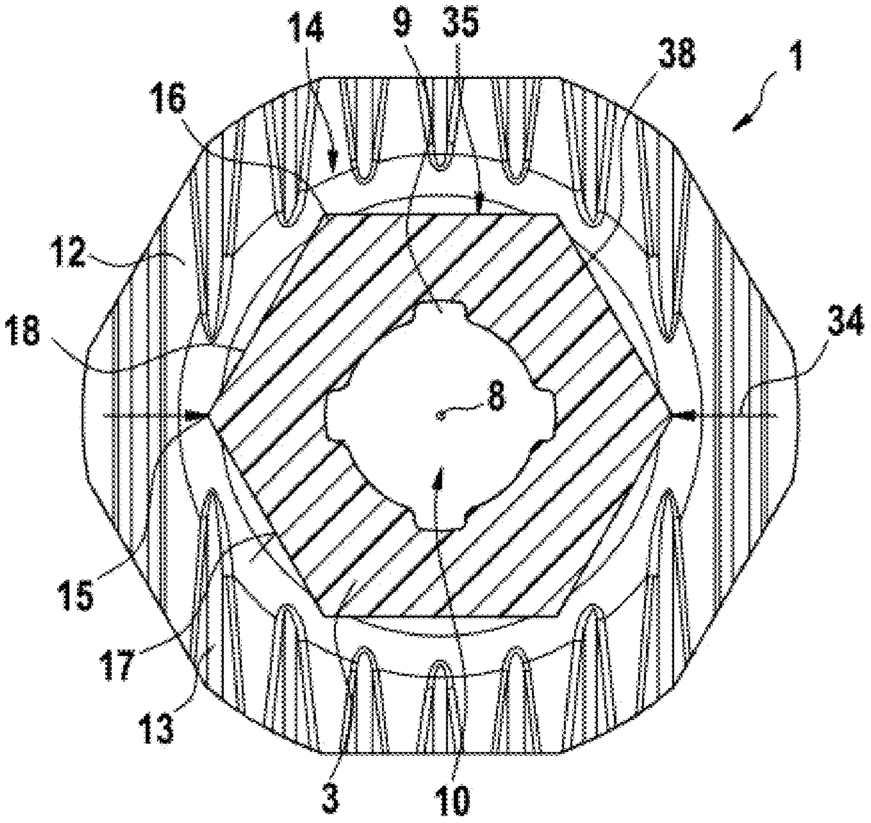
FIG. 3 shows a section through the first drywall anchor according to the invention in the region of the line III-III in FIG. 2, viewed toward the rear onto the underside of the flange.
Figure 4:
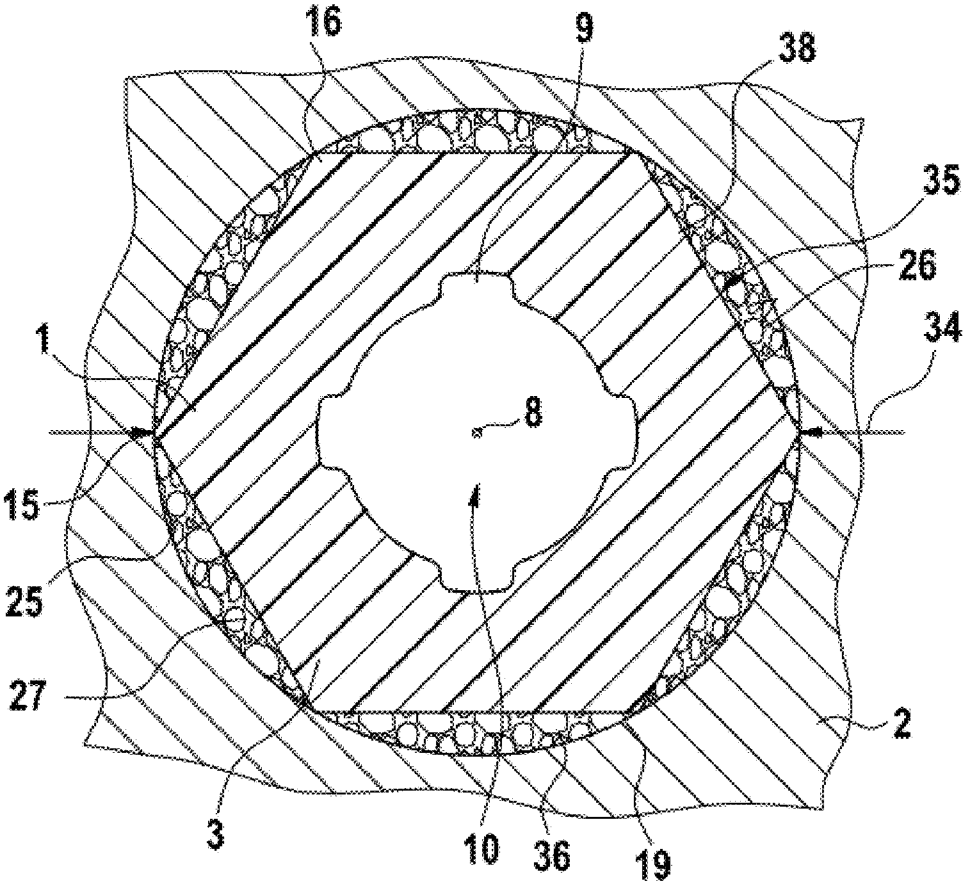
FIG. 4 shows a section through a fastening system including the first drywall anchor according to the invention and a gypsum plaster board after the drywall anchor has been installed, cut in the region of the line III-III in FIG. 2.

The base body 3 extends from a rear end 6 to a front end 7 along a longitudinal axis 8, which is also the longitudinal axis 8 of the drywall anchor 1. At the rear end 6, the base body 3 includes a tool holder 9 for a turning tool (not shown), which in the exemplary embodiment is a holder for a cross recess bit, as is apparent in FIGS. 3 and 4. In the direction of the longitudinal axis 8 toward the front, a screw channel 10 adjoins the tool holder 9 and extends toward the front end 7 of the base body 3, but in the exemplary embodiment does not extend through the entire length of the base body 3, but ends with a slit 11, which penetrates the base body 3 radially with respect to the longitudinal axis 8, at a distance before the front end 7 of the base body 3. A screw (not shown) can be screwed into the screw channel 10 for fastening an attachment part (not shown), such as a hook. The cutting plane of the sections of FIGS. 3 and 4 are in each case located in the transition region from the tool holder 9 to the screw channel 10. A peripheral flange 12 is disposed at the rear end 6 of the base body 3, which, at the circumference, has six straight sides, and includes several parallel-extending anti-rotation ribs 13 on the underside 14 thereof. After the drywall anchor 1 according to the invention has been installed as intended into a gypsum plaster board 2, the flange 12 rests with the underside 14 thereof against a visible side of the gypsum plaster board 2 and serves as a bearing surface for the attachment part. So as to prevent the drywall anchor 1 from rotating along with the screw during removal of the attachment part, during which the screw is unscrewed from the screw channel 10, such as to be undesirably unscrewed from a drill hole 36, the anti-rotation ribs 13, when installed as planned, cut into the visible side of the gypsum plaster board 2.

The base body 3 essentially has a non-circular cross-section over the entire length thereof, including six corners 15, 16 at the outer contour. This non-circular region 35 having a cross-section that includes six corners 15, 16 at the outer contour thereof extends from the front end 7 of the base body 3 to the flange 12, which is disposed at the rear end 6 of the base body 3. In a rear section 38, the basic shape of the base body 3 is a prism having six planar, identical lateral surfaces 17 that extend parallel to the longitudinal axis 8. The outer contour of a cross-section of the prism is a regular polygon in the shape of a regular hexagon. In a front section 20 of the base body 3, the cross-section of the base body 3 decreases in the manner of a frustum of a pyramid up to the drilling element 5. In this front section 20 as well, however, the cross-section continues to have an outer contour in the shape of a regular hexagon.

Generally speaking, the cross-section of the base body 3 is a polygonal area, which is to say an area that is enclosed by a polygon, wherein the polygon forms the outer contour including six corners 15, 16 in the exemplary embodiment. Neighboring corners of the polygon are connected in the cross-section to one another by straight stretches, for example a first corner 15 and a second corner 16 are connected by a first straight stretch 18. In the cross-section, all straight stretches 18 are located within a perimeter 19, which extends through the corners 15, 16 and is located in a radial plane with respect to the longitudinal axis 8, and the center of which is located on the longitudinal axis 8. This is apparent in FIG. 4, wherein a drill hole wall 26 of a drill hole 36, which is described in more detail below, is identical to the circumcircle 19 here.

The drilling element 5, the triangular edge 21 of which, ending in a tip 22 at the front, forms the front end of the drywall anchor 1 according to the invention, adjoins the front end 7 of the base body 3. The triangular edge 21 is seated in a hollow-cylindrical core bit 23, which at the front end thereof includes several saw teeth 24 arranged in a circular ring shape. The outside diameter 33 of the drilling element 5 is larger than the outside diameter of the front end of the base body 3 at the transition to the drilling element 5, but smaller than the outside diameter 34 of the non-circular region 35 of the base body 3 in the rear section 38, in which the base body 3 in the exemplary embodiment has the shape of a prism.

The external thread 4 is integrally connected to the circumferential surface of the base body 3. The thread extends helically around the longitudinal axis 8 and is designed as a kind of V-thread for cutting into the gypsum plaster board 2. The external thread 4 has a maximum thread height, which approximately corresponds to 0.4 times the outside diameter of the base body 3 at the rear end of the external thread 4.

For installing the drywall anchor 1 so as to create a fastening system, which includes the drywall anchor 1 and a gypsum plaster board 2, the drywall anchor 1 according to the invention is placed, by way of the tool holder 9, on a bit of a turning tool, for example a cordless screwdriver (not shown) and is pushed with the tip 22 against a visible side of the gypsum plaster board 2. When the drywall anchor 1 according to the invention is turned, the triangular edge 21 initially cuts open the cardboard of the visible side of the gypsum plaster board 2, and subsequently mills off the surface of the gypsum of the gypsum plaster board 2 until the saw teeth 24 of the hollow-cylindrical core bit 23 cut into the gypsum. Some of the material removed during drilling, for example drill dust, is received by the hollow-cylindrical core bit 23. After the drilling element 5 has created a drill hole 36 through the gypsum plaster board 2, the external thread 4 engages in the drill hole wall 26 of the drill hole 36 and digs itself into the gypsum plaster board 2 in a screwing motion. The corners 15, 16 of the base body 3 thus make contact with the drill hole wall 26. The corners 15, 16 in this case form milling elements, which widen the drill hole 36 so that, after installation as intended, the corners 15, 16 of the outer contour rest against the drill hole wall 26, as is shown in FIG. 4. The removed material 27 that resulted when the drill hole 36 was widened accumulates in clearances 25 that arise between the planar lateral surfaces 17 of the base body 3 and the drill hole wall 26. As a result, the drywall anchor 1 according to the invention becomes firmly seated in the drill hole 36, which allows the drywall anchor 1 to be screwed with low torque into the gypsum plaster board 2. Moreover, only little material can exit the drill hole 36 to the visible side and contaminate the environment, since the removed material 27 is received in the clearances 25 and in the hollow-cylindrical core bit 23. For the sake of clarity, the mating thread that is cut by the external thread 4 in the gypsum plaster board 2 is not shown.

After the drywall anchor 1 according to the invention has been installed as intended in the gypsum plaster board 2, an attachment part can be fastened to the drywall anchor 1 by way of a screw (not shown). For this purpose, the screw is screwed into the screw channel 10. The screw reaches the region of the screw channel 10 in which the slit 11 is also situated. In a rear section, the slit 11 extends parallel to the longitudinal axis 8, while extending transversely thereto in a front section, and ends in front of a predetermined breaking point 28, which is formed in the front section 20 of the base body 3. When the screw, which is screwed into the screw channel 10 in the direction of the longitudinal axis 8, meets with the transversely extending part of the slit 11, the two parts of the base body 3 split by the slit 11 are pushed apart radially with respect to the longitudinal axis 8, whereupon the predetermined breaking point 28 breaks. These two parts form a first spreading body 29 and a second spreading body 30, which are pushed against the drill hole wall 26 as a result of spreading and/or latchingly engage the rear side of the gypsum plaster board 2, whereby the seating and retention of the drywall anchor 1 in the drill hole 36 are improved. The external thread 4 is interrupted in the region of the slit 11 so that the external thread 4 does not impair spreading.

The drywall anchor 1 according to the invention can be easily installed in a gypsum plaster board 2, wherein, due to the design according to the invention of the drywall anchor 1, only a little removed material, such as drill dust, makes its way out of the drill hole 36 to the outside.

Figure 5:
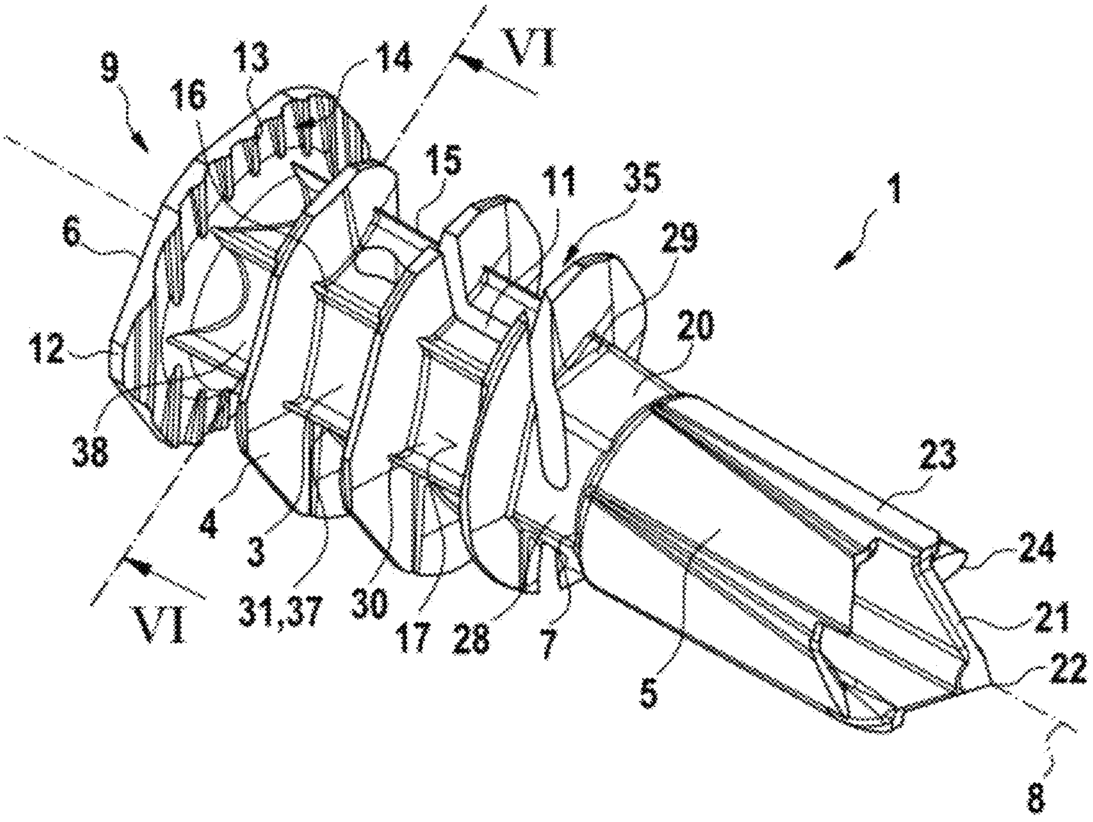
FIG. 5 shows a second drywall anchor according to the invention in a perspective view.
Figure 6:
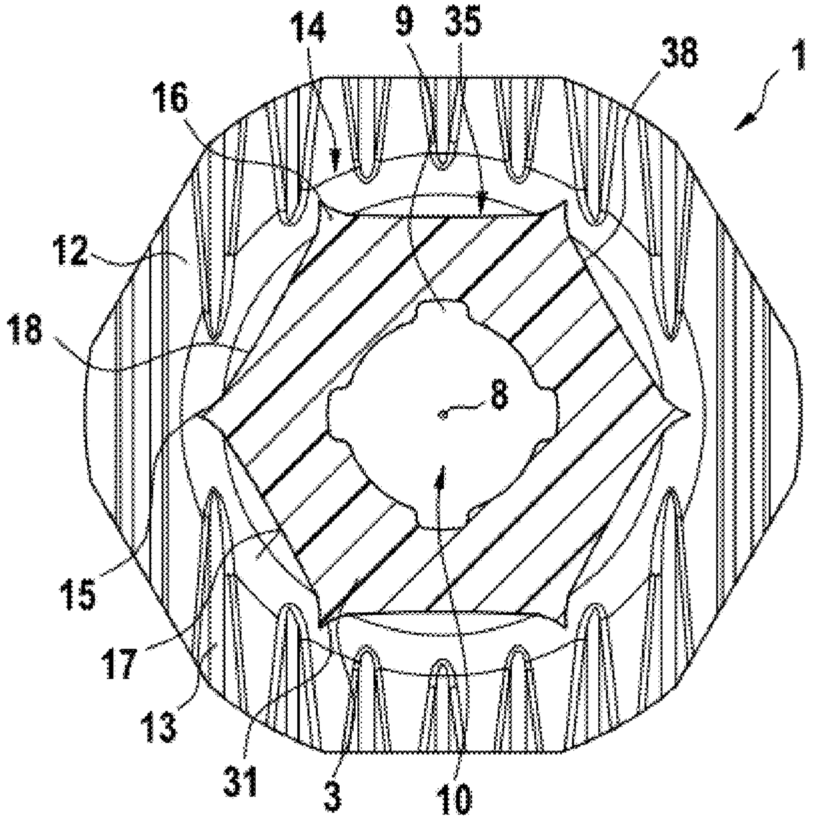
FIG. 6 shows a section through the second drywall anchor according to the invention in the region of the line VI-VI in FIG. 5, viewed toward the rear onto the underside of the flange.

The further figures show further exemplary embodiments which differ from one another exclusively in the region of the outer contour of the base body 3. FIGS. 5 and 6 show a second drywall anchor 1 according to the invention, which only differs from the first drywall anchor 1 according to the invention of FIGS. 1 to 4 in that a respective milling rib 31, extending in the longitudinal direction and serving as a milling body 37, is disposed at the corners 15, 16 of the base body 3 and projects radially to the outside from the base body 3. The milling rib 31 increases material removal during the widening of the of the drill hole 36 and enlarges the available clearance 25.

Figure 7:
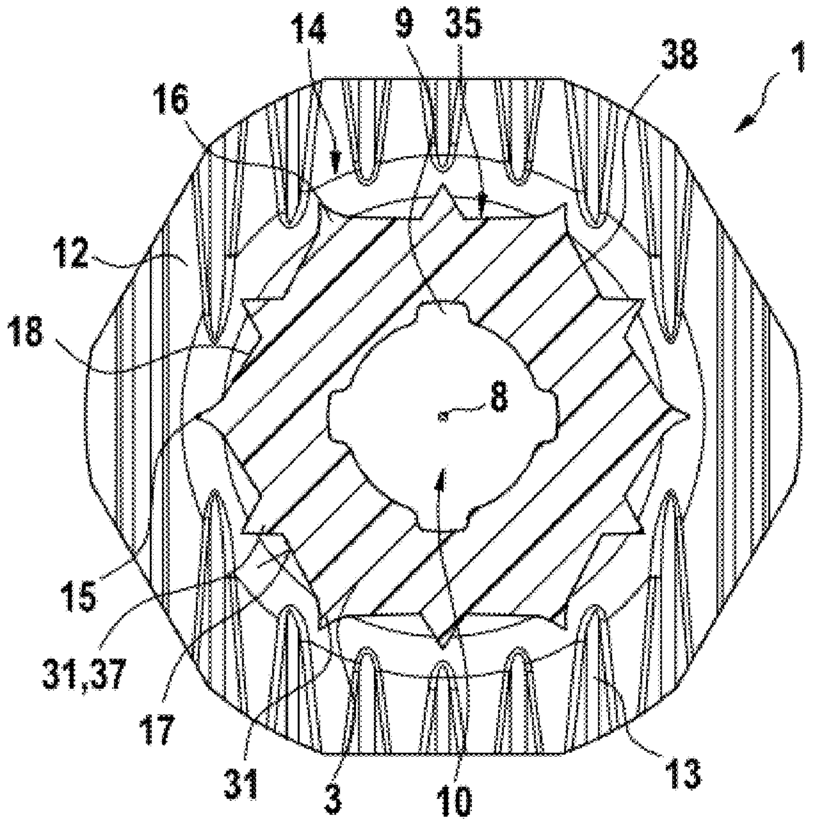
FIG. 7 shows a sectional illustration corresponding to FIG. 6 of a third drywall anchor according to the invention.

FIG. 7 shows a further exemplary embodiment in which a respective further milling rib 31 is disposed between the corners 15, 16.

Figure 8:
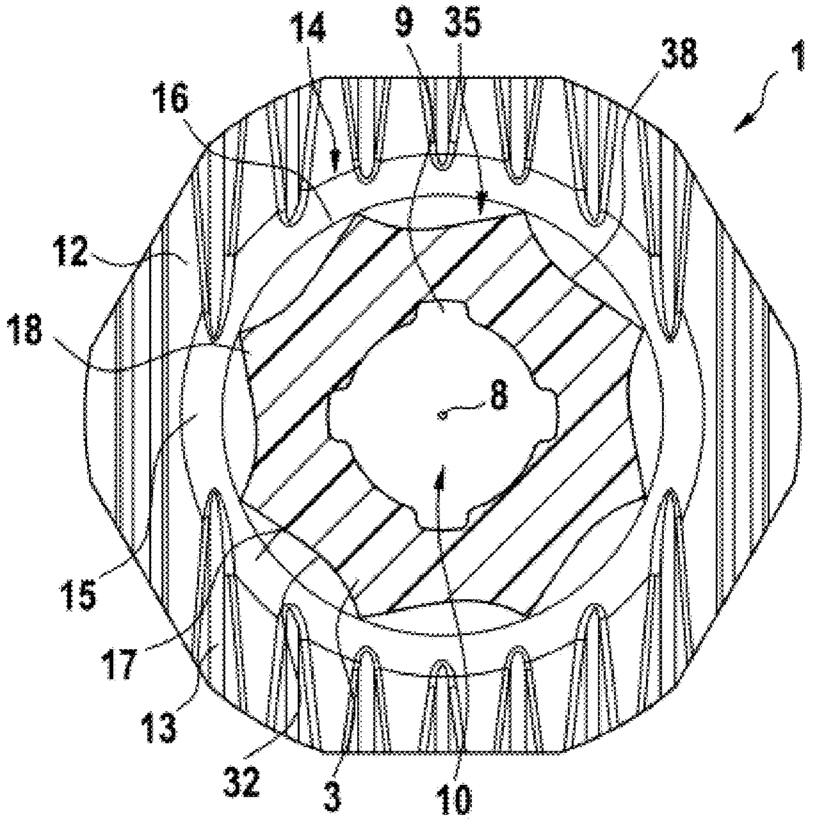
FIG. 8 shows a sectional illustration corresponding to FIG. 6 of a fourth drywall anchor according to the invention.

In contrast, the corners 15, 16 in the exemplary embodiment of FIG. 8 are not connected to one another by straight stretches, but rather the curves 32 connecting the corners 15, 16 are curved concavely to the inside, toward the longitudinal axis 8, whereby the milling properties of the corners 15, 16 are enhanced, and the clearances 25 that arise between the corners 15, 16, the curve 32 and the drill hole wall 26 are increased.

Figure 9:
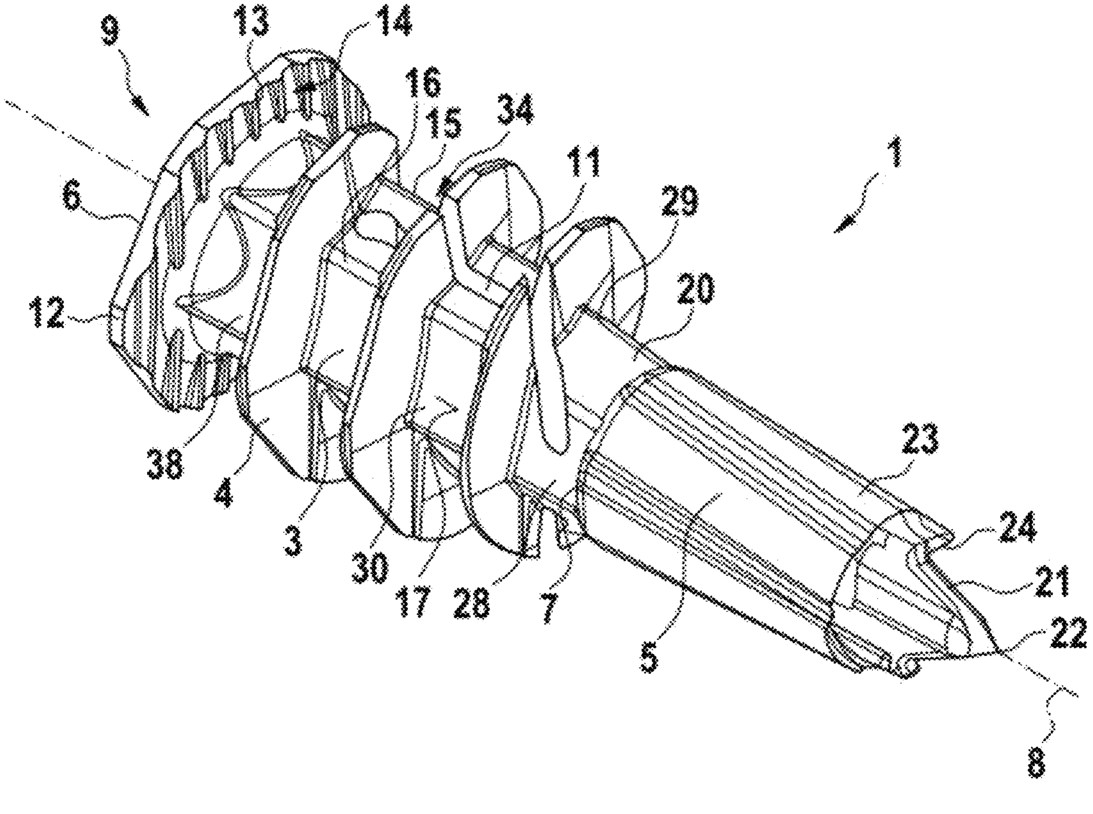
FIG. 9 shows a fifth drywall anchor according to the invention in a perspective view.
Figure 10:
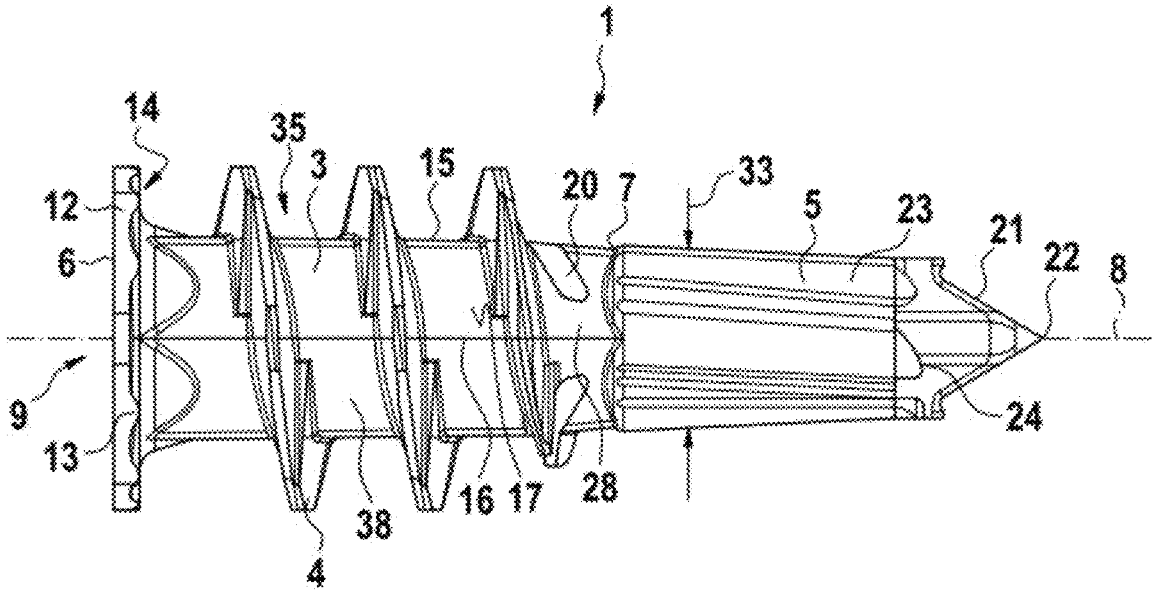
FIG. 10 shows a side view of the fifth drywall anchor according to the invention from FIG. 9.

The drywall anchor 1 according to the invention shown in FIGS. 9 and 10 includes a modified drilling element 5, the core bit 23 of which tapers conically, in the form of a truncated cone, to the front, toward the tip 22. This means that the outside diameter 33 of the core bit 23 or of the entire drilling element 5 decreases along the longitudinal axis 8 toward the front, so that the drilling element 5 widens the drill hole 36 as the drilling element 5 penetrates further into the gypsum plaster board 2. In addition, the edge 21 of the drilling element 5 is more acute than in the exemplary embodiments of FIGS. 1 to 8 so that the edge requires less force to be pushed into the gypsum plaster board 2 at the beginning of the installation process.

The various illustrated exemplary embodiments of the drywall anchor 1 according to the invention are each integrally produced from a plastic material in an injection molding process, for example from a polyamide. The drilling element 5, the flange 12, and the external thread 4 are thus each integrally connected to the base body 3. In principle, it is also possible to produce, for example, the drilling element 5 or parts thereof from another material and/or another plastic material. For example, the drilling element 5 can be made of a hard, fiber-reinforced plastic material instead of unreinforced polyamide, and the entire drywall anchor 1 according to the invention can be molded, for example, in a two-component injection molding process.

The invention claimed is:

1. A drywall anchor to be introduced into a gypsum plaster board in a self-drilling manner, the drywall anchor comprising a base body and a drilling element, an external thread being disposed on the base body, the base body extending from a rear end to a front end along a longitudinal axis of the drywall anchor, the base body comprising a tool holder for a turning tool at the rear end thereof, and the base body including a screw channel, which extends from the tool holder toward the front end of the base body, and the drilling element being disposed at the front end of the base body, wherein the base body comprises at least one non-circular region having a cross-section that includes at least three corners at the outer contour thereof, and each of the at least three corners is formed by corresponding adjacent surfaces of the base body.

2. The drywall anchor according to claim 1, wherein the at least three corners form milling elements for widening the drill hole.

3. The drywall anchor according to claim 1, wherein that at least one milling element for widening the drill hole includes a milling rib that is disposed on at least one of the corners and/or between at least two neighboring corners.

4. The drywall anchor according to claim 1, wherein at least two neighboring corners of the non-circular region are connected by a curve forming the outer contour, which is located within an imaginary circumcircle that circumscribes all corners.

5. The drywall anchor according to claim 4, wherein the curve is a stretch between two neighboring corners.

6. The drywall anchor according to claim 5, wherein the cross-section of the non-circular region of the base body is a polygonal area which is enclosed by a polygon, the polygon forming the outer contour including the at least three corners.

7. The drywall anchor according to claim 6, wherein the outer contour of the cross-section of the non-circular region of the base body is a regular polygon.

8. The drywall anchor according to claim 7, wherein the outer contour of the cross-section of the non-circular region of the base body is a hexagon.

9. The drywall anchor according to claim 1, wherein the non-circular region of the base body includes a prism.

10. The drywall anchor according to claim 1, wherein the non-circular region of the base body includes a frustum of a pyramid.

11. The drywall anchor according to claim 1, wherein the base body includes a conical outer surface proximal to a peripheral flange.

12. The drywall anchor according to claim 4, wherein the curve is curved at least in sections concavely to the inside toward the longitudinal axis.

13. The drywall anchor according to claim 1, wherein the base body has at least one slit extending radially through the base body and forming at least two spreading bodies.

14. The drywall anchor according to claim 13, wherein the external thread is interrupted in the region of the slit.

15. The drywall anchor according to claim 1, wherein a front section of the base body has a pyramid-shaped or truncated pyramid-shaped design.

16. The drywall anchor according to claim 1, wherein the drilling element has an outside diameter that is smaller than the outside diameter of the non-circular region of the base body and/or in that the drilling element has a conical or truncated cone-shaped design, is tapered to the front toward a tip, and comprises a hollow, crucible-shaped, core bit that is open to the front.

17. A method for installing a drywall anchor according to claim 1 for creating a fastening system which comprises the drywall anchor and a gypsum plaster board, a drill hole being drilled into the gypsum plaster board during introduction by way of the drilling element, wherein material of the gypsum plaster board which is removed in the drill hole is received in a clearance between the drill hole wall and between the circumferential wall between two neighboring corners of the non-circular region of the base body.

18. The method according to claim 17, wherein the drilling element has an outside diameter that is smaller than the outside diameter of the non-circular region of the base body, so that the non-circular region of the base body widens the drill hole during screwing-in by way of the corners, serving as milling elements, and/or at least one milling body.

19. A drywall anchor to be introduced into a gypsum plaster board in a self-drilling manner, the drywall anchor comprising a base body and a drilling element, an external thread being disposed on the base body, the base body extending from a rear end to a front end along a longitudinal axis of the drywall anchor, the base body comprising a tool holder for a turning tool at the rear end thereof, and the base body including a screw channel, which extends from the tool holder toward the front end of the base body, and the drilling element being disposed at the front end of the base body, wherein the base body comprises at least one non-circular region having a cross-section that includes at least three corners at the outer contour thereof, each of the at least three corners is formed by corresponding adjacent surfaces of the base body, at least two neighboring corners of the non-circular region are connected by a curve forming the outer contour, which is located within an imaginary circumcircle that circumscribes all corners, and the curve is curved at least in sections concavely to the inside toward the longitudinal axis.

* * * * *